Figure 1:
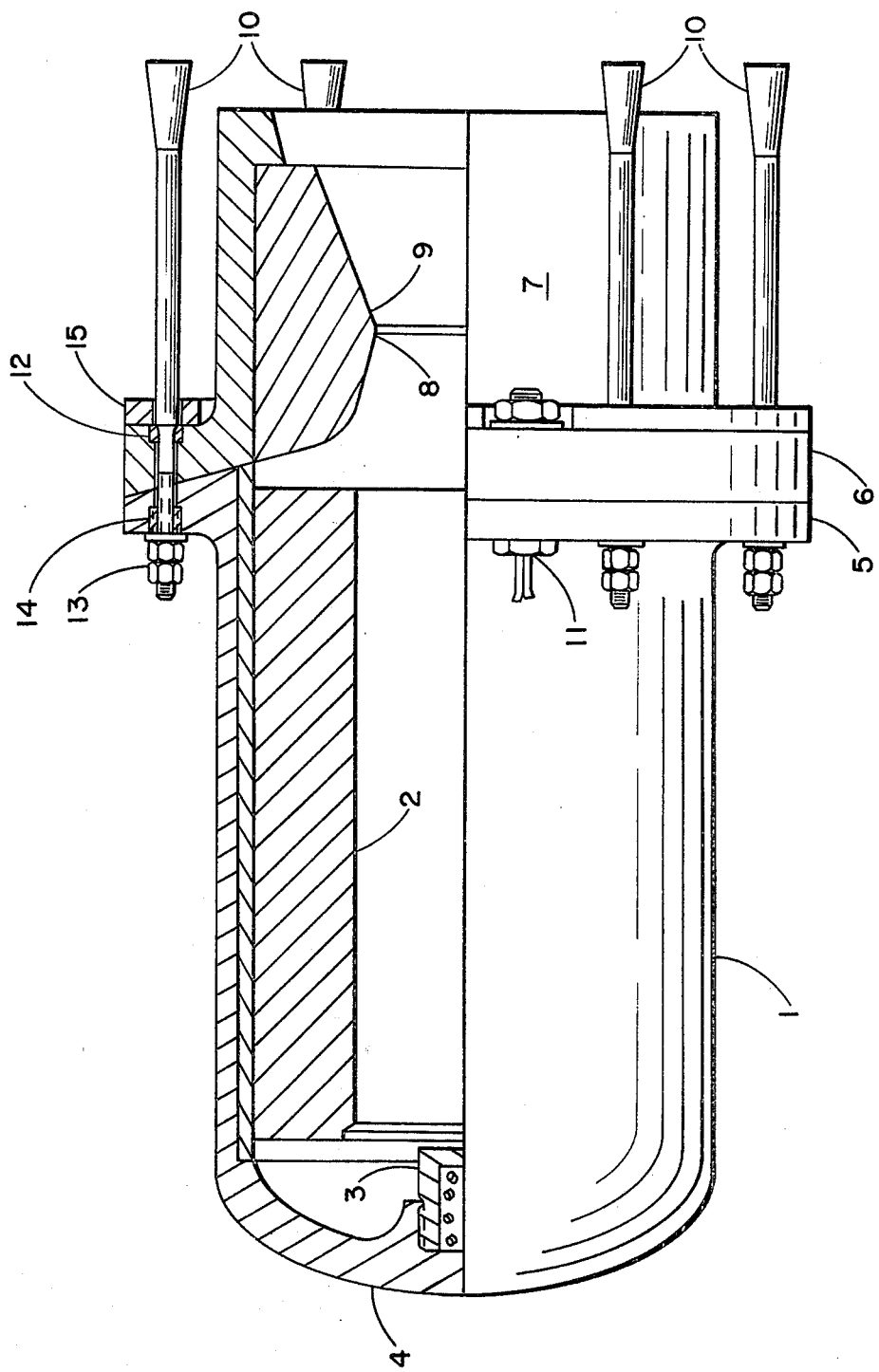

United States Patent [19]

LeFebvre

[11] 3,999,379
[45] Dec. 28, 1976

[54] REDUCTION OF DEPRESSURIZATION THRUST TERMINATION JOLT

[75] Inventor: Clarence A. LeFebvre, San Jose, Calif.

[73] Assignee: United Technologies Corporation, Hartford, Conn.

[22] Filed: Sept. 15, 1975

[21] Appl. No.: 613,371

[52] U.S. Cl. .................. 60/204; 60/234; 102/49.5; 102/49.8; 220/89 A; 220/328; 220/281; 239/265.25

[51] Int. Cl.² ............... F02K 1/08; F02K 9/04

[58] Field of Search ........... 60/254, 234, 204; 102/49.3, 49.5, 49.8; 220/89 A, 327, 328, 261, 281, 360, 379; 239/265.25, 265.31

[56] References Cited

UNITED STATES PATENTS

| 1,677,403 | 7/1928  | Morrison | 220/379    |
|-----------|---------|----------|------------|
| 3,122,098 | 2/1964  | Glennan  | 60/254     |
| 3,221,495 | 12/1965 | Tweet    | 60/254     |
| 3,302,890 | 2/1967  | Silver   | 239/265.31 |
| 3,613,374 | 10/1971 | Ritchey  | 60/254     |
| 3,626,697 | 12/1971 | Nunn et al. | 60/254  |

Primary Examiner—Carlton R. Croyle
Assistant Examiner—Robert E. Garrett
Attorney, Agent, or Firm—Steven F. Stone

[57] ABSTRACT

Thrust termination of a solid propellant rocket motor is obtained by connecting the nozzle to the combustion chamber pressure vessel by means of explosive and extrusable bolts. When it is desired to obtain thrust termination, the explosive bolts are blown leaving the nozzle connected to the pressure vessel by the extrusable bolts. The extrusable bolts have sufficient strength to retain the nozzle assembly; however, upon elimination of the strength of the explosive bolts, the nozzle is permitted to separate from the pressure vessel and move to the rear by drawing the extrusable bolts through dies. The bolts deform to absorb the energy of the nozzle and the jolt of forward acceleration which would normally be obtained if the nozzle were ejected, is reduced or eliminated.

11 Claims, 2 Drawing Figures

REDUCTION OF DEPRESSURIZATION THRUST TERMINATION JOLT

BACKGROUND OF THE INVENTION

Reaction motor burn times can be controlled by various approaches depending upon the nature of the fuel in the reaction motor. For example, if one or all of the fuel components of a reaction motor are in fluid form, it is possible to control the burn time merely by shutting off the flow of one of these components. If, however, the rocket motor is designed to use nonflowing fuel materials, such as is the case of a typical solid propellant rocket motor where a propellant grain of particular size and configuration is located within a combustion chamber, it is not possible to control the flow of a propellant component to the combustion chamber. In this type of rocket motor, the propellant is designed to produce a predetermined thrusttime curve but as mission requirements vary, it sometimes becomes necessary to terminate the thrust prior to the time at which the entire propellant grain has been consumed. Thus, it becomes necessary to somehow extinguish the combustion process with the combustion chamber prior to consumption of the entire grain. One approach to accomplishing this is by physically quenching the combustion process by injection of a liuqid such as water which will absorb a substantial amount of heat upon vaporization and reduce the temperature of the grain below that at which it will continue to burn. This approach, of course, requires rapid injection of relatively large amounts of fluid and necessarily requires the carrying of an amount of combustion termination fluid on board. This necessarily detracts from the available payload. Another approach which is more readily used in large solid propellant rocket motors is to depressurize the combustion chamber. As a result of the burning characteristics of many solid propellants, the combustion process is pressure sensitive and it is known that a rapid depressurization of the combustion chamber can extinguish the combustion process on the grain. Two approaches are used in accomplishing this - forward-end thrust termination and aft-end thrust termination. In the forward-end thrust termination system, a large port or a plurality of small ports are provided through the forward closure which ports are sealed by plates adapted to be released, for example, by means of explosive bolts or Primacord. When the appropriate signal is obtained, the explosive is detonated and the port covers ejected, causing rapid depressurization. The disadvantage with forward-end thrust termination is that it may interfere with the location of the payload, produce a sharp rearward or axially offset acceleration jolt, require a more complex internal geometry for the propellant in the forward end and the debris produced by the port is ejected at a place where it can cause damage to the rocket vehicle. Also, the port area is limited by the weight of propellant which must be eliminated. Thus, in some cases, the mission requirements prohibit the use of ports large enough to prevent the chamber pressure from building up to the re-ignition pressure where the motor will spontaneously re-ignite.

When aft-end thrust termination is employed, one approach is to explosively sever the nozzle assembly from the aft end of the rocket, thereby opening up a substantially larger exit port, causing rapid depressurization. This approach has the advantage of ejecting the debris in a direction in which it will not interfere with the rocket motor itself; however, the sudden release of a large volume of gas through the newly opened exit port of the rocket motor produces an extremely high forward acceleration jolt. In many cases this jolt, as well as the rearward jolt produced by forward end thrust termination, can be greater than can be tolerated by the payload. Because of this effect, it is sometimes not possible to open up a port large enough to maintain the pressure within the motor below the re-ignition pressure.

It is an object of this invention to provide for the reduction or elimination of the jolt which occurs on the opening of a thrust termination port.

It is another object of this invention to provide aft-end thrust termination in a manner which retains all the advantages of the previous aft termination systems with respect to damage from debris and at the same time reduces or eliminates the undesirable acceleration jolt.

It is another object of this invention to provide for thrust termination by depressurization which is capable of maintaining the pressure within the motor below the re-ignition pressure.

Another object of this invention is to provide a rocket motor nozzle assembly capable of providing aft-end thrust termination without an excessive acceleration jolt.

Figure 2:
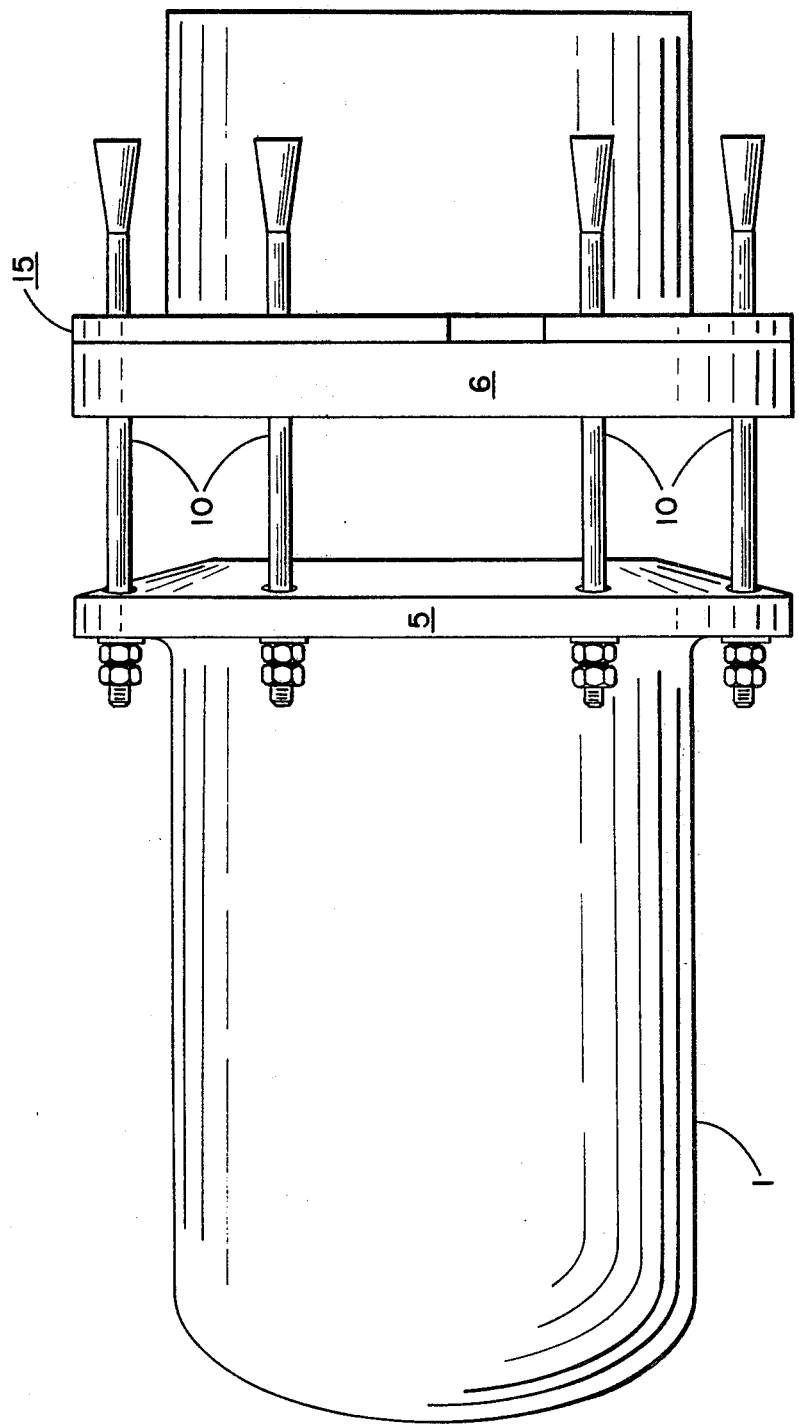

These and other objects of the invention will be readily apparent from the following description with reference to the accompanying drawings wherein:

FIG. 1 is a side view, partly in sections, of one embodiment of this invention in its pre-termination configuration; and, FIG. 2 is a side view of the embodiment of FIG. 1 in its post-termination configuration.

DESCRIPTION OF THE INVENTION

A rocket motor, according to the invention, comprises a combustion chamber 1 containing a solid fuel grain 2 and igniter 3 mounted in the forward closure 4. The aft end of the pressure vessel 1 terminates in a flange 5 adapted to engage a corresponding flange 6 on the nozzle assembly 7 which comprises a throat portion 8 and exit cone portion 9. The flanges 5 and 6 are provided with a series of annularly arranged holes which are adapted to receive either explosive bolts 11 or extrusable bolts 10. In addition to functioning as a means for fastening the various components together, the flanges also perform a more significant function in that they will permit the combustion gases to escape, upon the opening up of the thrust termination port, in a substantially symmetrical pattern such that no net transverse thrust is produced which could effect the path of travel of the motor. Thus, while it is usually desirable that no net transverse thrust be produced, it is often desirable that some net axial thrust, either forward or backward, be generated. Thus, for example, as is illustrated in the embodiment shown, the flanges are beveled in the forward direction so that the gases escaping on thrust termination will produce a forward thrust component to counteract the rearward thrust produced by the gases escaping through the original nozzle. It is apparent, however, that the flanges can be unbeveled or rearwardly beveled to produce any desired thrust component which may be requested for any particular mission.

Each of the holes for receiving an extrusable bolt contains an extrusion die 12 of slightly narrower diameter than the main portion of the extrusable bolt 10 but of diameter equal to the forward portion of the bolt such that the bolt may be inserted through the die up to the shoulder on the bolt. The bolt then extends through the holes in flanges 5 and 6 and may either be threaded into flange 5 which will prevent the nozzle, after actuation, from falling back into a closed position or, alternatively and in many cases preferred, it is just maintained in place by bolts 13 and washer 14 which are threaded onto the end of the bolt. Dies 12 are maintained in place by retaining 15 fastened to flange 6.

The number of extrusable bolts and explosive bolts are selected such that when all bolts are functioning, the nozzle flange 6 if firmly held to combustion chamber closure flange 5 with an adequate factor of safety but when the explosive bolts 11 are blown, the forces exerted on the extrusable bolts will be within their limits of strength but will permit extrusion of the bolts through the dies as the nozzle assembly moves rearward. It has been found that standard hardened drill guide bushings and standard commercially available multiple center-ground bolts have appropriate tolerances (0.0002 inches, and 0.001 inches, respectively) to permit the nozzle to move rearwardly in a predictable manner without cocking.

In operation, the rocket motor would be ignited in a normal fashion and would be allowed to burn. If, for some reason, it became necessary to terminate the thrust of the rocket motor prior to the complete consumption of the fuel grain 2, an appropriate signal would be sent to the explosive bolts 11 and they would be fired. When the explosive bolts are fired, the strength of the remaining extrusable bolts is sufficient to keep them from breaking but insufficient to prevent extrusion of the bolts through the dies 12. Thus, upon release of the explosive bolts, the forces exerted by the pressurized combustion gases cause the nozzle assembly to move rearwardly extruding the bolts 10 through the dies 12. Thus, although large pressure forces act forward on the motor, they are substantially equal to the forces on the nozzle but in the opposite direction. The extrudable bolts join both the motor and nozzle thereby only allowing the small difference, if any, of these forces to exert a minor jolt on the payload.

The nozzle assembly moves rearwardly until all the energy of the nozzle has been absorbed through deformation of the bolts, reaching the configuration shown in FIG. 2. Once the nozzle assembly has separated from the combustion chamber closure, gasses will rapidly escape through the space between the nozzle and the closure, rapidly depressurizing the rocket motor. Since the motor remains connected to the nozzle by the extrusable bolts, in theory, there should be no noticeable acceleration jolt upon depressurization. In practice, however, since state-of-the-art rocket motors do not have a constant chamber pressure throughout the entire burn time, and since it is never known at what portion of the combustion cycle it may be necessary to terminate thrust, it is necessary to design the extrusable bolts so that they will be operable at the smallest extrusion forces which would occur under the minimum chamber pressure conditions. Thus, if actual extinguishment occurs at chamber pressures higher than this minimum, the bolts will not be able to absorb all of the pressure loads and some jolt is experienced on the rocket motor. Thus, with a given missile having ratios of $P_c$ max/$P_c$ min approaching 2 to 1, the bolts can be designed to absorb sufficient loads to maintain the jolt below the normal operating maximum acceleration of 12 Gs. It should be noted that, for the given missile, if thrust termination was obtained at these conditions without the use of extrusable bolts, the shock would have been over 25 Gs. It should also be noted that the termination port size is limited only by the diameter of the aft end of combustion chamber and there it is no problem with such a configuration to maintain the chamber pressure below the re-ignition pressure without compromising range or payload.

EXAMPLE 1

A solid propellant motor having a 40.0 pound, 9.0-inch o.d., 5.0-inch o.d. grain operating through a 1.0-inch nozzle throat, producing 1100 pounds of thrust at a nominal chamber pressure of 1000 psi was fired. The nozzle was held to the combustion chamber by means of three ½-inch diameter explosive bolts and six 8-inch long 160,000 psi steel extrusable bolts which pass through a 0.25-inch die. The nominal diameter of the extrusable portion of the bolt was 0.265-inches. Upon a predetermined signal the explosive bolts were fired and the nozzle moved aftward on the extrusable bolts. The motor pressure was reduced to less than 1 psi within 130 ms and the motor was extinguished.

While this invention has been described with respect to certain specific embodiments thereof, it should not be construed as being limited thereof. For example, while the invention has been described with respect to opening a port between the nozzle assembly and the combustion chamber, this location is primarily a matter of convenience due to the manner in which most rocket motors are constructed and is not essential to the invention. The invention can operate, for example, with the formation of a rearwardly directed port at points more forward on the combustion chamber than the nozzle entrance as long as the forward and aft portions formed on separation are connected together as disclosed herein.

Further, while the preferred embodiment of this invention is an aft end thrust termination system due to the substantial advantages inherent in aft end termination, certain aspects of this invention render it useful in systems employing forward end or lateral thrust termination. Any system in which a port is suddenly opened in a reaction motor will produce a reaction jolt from the sudden escape of large amounts of gas. By maintaining physical connection between the motor and the severed port-forming element by means of extrusable bolts or other permanently deformable elements, the jolt from the port opening can be reduced or eliminated. As used herein the term "permanently deformable element" is not limited to the preferred extrusable bolts. The term also includes elements such as a hydraulic piston-cylinder which does work on the fluid in moving from the closed to open position. The hydraulic cylinder approach is particularly attractive where re-startable systems are needed. Thus, fluid could be allowed to bleed out of the cylinder into a reservoir during opening and forced back into the system to close and reseal the port to permit restarting of the motor.

Further, it is not always essential that combustion of the propellant be extinguished in order to obtain thrust termination. The net thrust on the rocket motor can be terminated, according to this invention, by neutralizing the forward and backward components of thrust produced by the continued combustion of the propellant. This can readily be obtained by appropriate selection of the cant on the nozzle flange and the bolt extrusion length. In such an embodiment, the bolts would have to be made of a high-temperature, resistant metal if they are to be exposed to combustion gases for any long period of time after thrust termination is desired.

Accordingly, this description is exemplary of the invention which is limited only by the following claims:

I claim:
1. In a method for thrust termination of a reaction motor by depressurization of the combustion chamber which comprises forming a port in the combustion chamber by causing a portion of the structure defining said combustion chamber to move away from the remainder of the structure, the improvement whereby the jolt produced by the escape of gas through said port is reduced which comprises:
   a. maintaining said portion of said combustion chamber structure physically connected to the remainder of said structure by deformable connecting means during the movement of said portions away from each other;
   b. directing the gases escaping through the port formed between said portion and the remainder of the structure into a pattern substantially symmetrically distributed about an axis extending substantially parallel to the direction of motion;
   c. permanently deforming said connecting means as said portions move away from each other.
2. The method of claim 1 wherein said deformable connecting means comprises a plurality of metal elements passing through a plurality of dies on one of said portions and said connecting means are permanently deformed by extrusion of the metal elements through said dies.
3. A depressurization thrust termination system for a reaction motor comprising:
   a. means defining a combustion chamber;
   b. thrust termination port forming means for separating said combustion chamber defining means into first and second portions;
   c. deformable connecting means connecting said first portion to said second portion; and,
   d. means for permanently deforming said connecting means as said first and second portions move away from each other.
4. The system of claim 3 wherein said thrust termination port is configured to direct gases escaping therethrough into a pattern substantially symmetrically distributed about an axis parallel to the direction of motor of said first and second portions.
5. A thrust termination system for a reaction motor comprising, in combination:
   a. a combustion chamber
   b. thrust termination port forming means adapted to produce a substantially symmetrical radially distributed gas pattern;
   c. a plurality of connecting means for releasability, maintaining said port forming means in gas sealing contact with said combustion chamber;
   d. means for rendering said connecting means partially inoperative; and,
   e. means for permanently deforming the remainder of said connecting means as said port forming means separate from said combustion chamber.
6. The system of claim 5 wherein,
   a. said port forming means comprises:
      i. a separate nozzle means provided with means for engaging said connecting means; and,
      ii. means for engaging said connecting means on said combustion chamber;
   b. said connecting means comprises a plurality of structural elements coacting with said engaging means on said nozzle and combustion chamber, the strength of the total number of said element being adequate to maintain said nozzle and said combustion chamber in gas sealing relationship under the operating conditions of said reaction motor, said total number comprising first and second portions, the strength of said second portion being inadequate to maintain said nozzle means and combustion means in gas sealing relationship but sufficient to prvent breakage of said second portion of said structure elements under the operating conditions of said reaction motor; and,
   c. said means for rendering a portion of said connecting means inoperative function on said first portion of said structural elements.
7. The system of claim 5 wherein said means for permanently deforming said connecting means comprises extrusion dies receiving said connecting means in manner permitting extrusion of said connecting means through said die as said port forming means separates from said combustion chamber.
8. The system of claim 6 wherein said means for permanently deforming said connecting means comprises extrusion dies mounted in one of said nozzle means and combustion chamber said extrusion dies receiving said second portion of said structural elements in a manner permitting extrusion thereof upon separation of said nozzle means from said combustion chamber.
9. A system of claim 5 wherein said port forming means is configured to produce a pattern of gas flow substantially symmetrically distributed transversely to an axis parallel to the direction of the separation of said port forming means from said combustion chamber.
10. The system of claim 6 wherein said port forming means is configured to produce a pattern of gas flow substantially symmetrically distributed transversely to an axis parallel to the direction of the separation of said port forming means from said combustion chamber.
11. The system of claim 7 wherein said port forming means is configured to produce a pattern of gas flow substantially symmetrically distributed transversely to an axis parallel to the direction of the separation of said port forming means from said combustion chamber.

* * * * *

UNITED STATES PATENT OFFICE
CERTIFICATE OF CORRECTION

Patent No. 3,999,379   Dated December 28, 1976

Inventor(s) Clarence C. LeFebvre

It is certified that error appears in the above-identified patent and that said Letters Patent are hereby corrected as shown below:

On the Cover sheet "11 Claims" should read --14 Claims--.

Column 1, line 19.  Cancel "thrusttime" and insert ---thrust-time---.

Column 1, line 24.  Cancel "with" and insert ---within---.

Column 3, line 11.  After "retaining" insert ---ring---.

Column 3, line 49.  Cancel "gasses" and insert ---gases---.

Claim 4, line 4.  Cancel "motor" and insert ---motion---.

Claim 5, line 7.  Cancel "releasability" and insert ---releasably---.

Claim 6, line 18.  Cancel "prvent" and insert ---prevent---.

Claim 7, line 3.  After "in" insert ---a---.

Add the following claims:

---   12. In a method for depressurization of the combustion chamber of a reaction motor which comprises forming a port in the combustion chamber by causing a portion of the structure defining said combustion chamber to move away from the remainder of the structure, the improvement which comprises:

(a) maintaining said portion of said combustion chamber structure physically connected to the remainder of said structure by deformable connecting means during the movement of said portions away from each other; and

UNITED STATES PATENT OFFICE
CERTIFICATE OF CORRECTION

Patent No. 3,999,379　　　　　　　　Dated December 28, 1976

Inventor(s)　　Clarence A. LeFebvre

It is certified that error appears in the above-identified patent and that said Letters Patent are hereby corrected as shown below:

(b) permanently deforming said connecting means as said portions move away from each other.

13. In a method for reducing the pressure within the combustion chamber of a reaction motor which comprises forming a port in the combustion chamber by causing a portion of the structure defining said combustion chamber to move away from the remainder of the structure, the improvement whereby the jolt produced by the escape of gas through said port is reduced which comprises:

(a) maintaining said portion of said combustion chamber structure physically connected to the remainder of said structure by deformable connecting means during the movement of said portions away from each other;

(b) directing the gases escaping through the port formed between said portion and the remainder of the structure into a pattern substantially symmetrically distributed about an axis extending substantially parallel to the direction of motion;

UNITED STATES PATENT OFFICE
CERTIFICATE OF CORRECTION

Patent No. 3,999,379            Dated December 28, 1976

Inventor(s) Clarence A. LeFebvre

It is certified that error appears in the above-identified patent and that said Letters Patent are hereby corrected as shown below:

(c) permanently deforming said connecting means as said portions move away from each other.

14. A system for reducing the chamber pressure of a reaction motor combustion chamber comprising, in combination:

(a) means defining a combustion chamber;

(b) port-forming means for separating said combustion chamber defining means into first and second portions;

(c) deformable connecting means connecting said first portion to said second portion; and (d) means for permanently deforming said connecting means as said first and second portions move away from each other.

Signed and Sealed this

Seventh Day of June 1977

[SEAL]

Attest:

RUTH C. MASON
*Attesting Officer*

C. MARSHALL DANN
*Commissioner of Patents and Trademarks*